United States Patent

Kusuki et al.

Patent Number: 5,246,743
Date of Patent: Sep. 21, 1993

[54] METHOD OF ENHANCING GAS SEPARATION PERFORMANCE OF AN AROMATIC POLYIMIDE MEMBRANE

[75] Inventors: Yoshihiro Kusuki; Shunsuke Nakanishi, both of Ichihara, Japan

[73] Assignee: Ube Industries, Ltd., Yamaguchi, Japan

[21] Appl. No.: 978,635

[22] Filed: Nov. 19, 1992

[30] Foreign Application Priority Data

Nov. 26, 1991 [JP] Japan ............... 3-355391

[51] Int. Cl.$^5$ ............... B05D 3/06
[52] U.S. Cl. ............... 427/569; 427/296
[58] Field of Search ............... 427/569, 296

[56] References Cited

FOREIGN PATENT DOCUMENTS

| | | |
|---|---|---|
| 57-94304 | 6/1982 | Japan . |
| 57-94305 | 6/1982 | Japan . |
| 57-150423 | 9/1982 | Japan . |
| 58-8503 | 1/1983 | Japan . |
| 60-99323 | 6/1985 | Japan . |
| 60-99324 | 6/1985 | Japan . |
| 60-99325 | 6/1985 | Japan . |
| 60-99326 | 6/1985 | Japan . |
| 60-99327 | 6/1985 | Japan . |
| 61-107923 | 5/1986 | Japan . |
| 62-204825 | 9/1987 | Japan . |
| 62-204826 | 9/1987 | Japan . |
| 62-204827 | 9/1987 | Japan . |
| 2089285 | 12/1981 | United Kingdom . |

Primary Examiner—Bernard Pianalto
Attorney, Agent, or Firm—Burgess, Ryan & Wayne

[57] ABSTRACT

A method of enhancing the gas-separation performance of an aromatic polyimide membrane with high reproducibility, by plasma-treating an asymmetric aromatic polyimide membrane comprising 80 to 100 molar % of at least one type of recurring units selected from those of the formulae (A) and (B) and 0 to 20 molar % of recurring units of the formula (C):

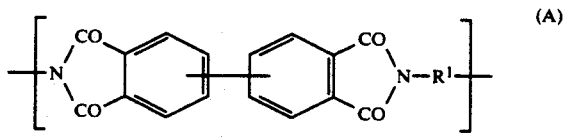

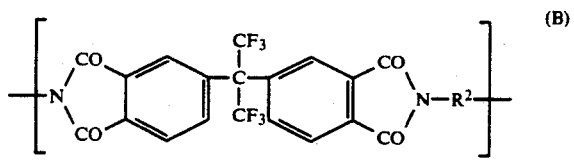

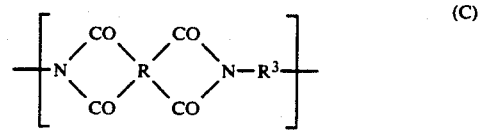

in the formulae of which, $R^1$, $R^2$, $R^3$ = an aromatic residue derived from an aromatic diamine compound and R = a tetravalent aromatic residue derived from an aromatic tetracarboxylic acid compound and different from tetravalent the aromatic tetracarboxylic acid residues appearing in the formulae (A) and (B), and has a helium gas-permeation rate $[P_{He}]$ of $1 \times 10^{-4}$ cm$^3$/cm$^2$.sec.cmHg or more at 80° C. and a ratio $[P_{He}]/[P_{N2}]$ of the helium gaspermeation rate $[P_{He}]$ to a nitrogen gas-permeation rate $[P_{N2}]$ of 20 or more at 80° C., in an atmosphere comprising ammonia.

17 Claims, No Drawings

METHOD OF ENHANCING GAS SEPARATION PERFORMANCE OF AN AROMATIC POLYIMIDE MEMBRANE

BACKGROUND OF THE INVENTION

1. Field of the Invention

The present invention relates to a method of enhancing a gas-separation performance of an aromatic polyimide membrane.

More particularly, the present invention relates to an industrial method of enhancing a gas separation performance of an asymmetric aromatic polyimide membrane comprising a specific aromatic polyimide made from an aromatic tetracarboxylic acid component comprising a biphenyltetracarboxylic acid compound and/or 2,2-bis(3,4-dicarboxyphenyl)hexafluoropropane dianhydride, and an aromatic diamine component, and having specific gas separation properties, to provide an enhanced gas separation membrane having a very high ratio of a helium gas-permeation rate $[P_{He}]$ to a nitrogen gas-permeation rate $[P_{N2}]$.

In the specification of the present application, a ratio of a gas permeation rate of a gas (A), $[P_{(A)}]$ to a gas permeation rate of another gas (B), $[P_{(B)}]$, is represented by a term, "gas separation factor $[P_{(A)}]/[P_{(B)}]$" of the gas separation membrane with respect to the gases (A) and (B).

2. Description of the Related Art

Various methods of enhancing a gas separation factor (selective permeation) of an asymmetric gas separation membrane having a high heat resistance have been known with respect to various polymer membranes.

For example, a known method of producing a gas separation membrane having an enhanced gas separation factor comprises the steps of preparing a gas separation porous membrane from a dope solution of a heat-resistant polymer by a wet film-forming procedure, and heat-treating the porous membrane to form a dense surface layer therein.

However, in the case where the gas separation factor of a gas separation membrane made from a heat resistant polymer is enhanced by a heat-treatment, the gas-separation membrane must be exposed to a very high temperature for a long time. This heat treatment causes the surface layer of the gas-separation membrane to be excessively and/or unevenly modified and the gas-permeability of the gas separation membrane to be reduced. Accordingly, the conventional method is disadvantageous in that the enhanced gas separation membrane having an enhanced gas separation factor cannot be produced with a satisfactory reproducibility.

Recently, various methods of enhancing the gas separation factor of gas separation membranes made of a heat resistant polymer by applying a plasma treatment to the surface of the gas separation membrane, have been proposed.

For example, British Patent Publication No. 2,089,285A and Japanese Unexamined Patent Publication No. 58-8503 disclose a method of producing a gas separation membrane (hollow fiber) having an enhanced gas separation factor by applying a plasma treatment to a porous membrane (substrate) made of a heat resistant polymer, for example, polysulfone or polyacrylonitrile, in the presence of a gaseous organic compound and/or an inert gas, to form a dense (separating) layer or to modify a surface layer thereof.

It is however very difficult for the above-mentioned plasma treatment method to form a uniform dense layer in the surface portion of the gas separation membrane or to uniformly modify the surface portion of the gas separation membrane with high reproducibility.

Also, Japanese Unexamined Patent Publication Nos. 60-99,323 through 99,327, and 62-204,825 through 204,827 disclose a method for producing a gas separation membrane provided with a dense layer by plasmapolymerizing an unsaturated fluoro compound, for example, perfluorocyclohexene, perfluoroheptene-1, tetrakis(trifluoromethyl)ethylene or tetrakis(trifluoromethyl) diethane, onto a porous membrane of a polysulfone, polyamide, or polyacrylonitrile.

Further, Japanese Unexamined Patent Publication No. 61-107,923 discloses a method of producing a selectively permeating composite membrane, comprising the steps of forming a polymer layer on an asymmetric porous membrane comprising a specific polyetherimide polymer produced from a specific 2,2-bis[4-(3,4-dicarboxyphenoxy)phenyl]propane dianhydride and a phenylene diamine by plasma-polymerizing a polymerizable monomer such as an unsaturated silane compound, and further forming a thin coating layer from an organosiloxane compound on the polymer layer.

Each of the conventional composite gas separation membrane produced by the above-mentioned plasma-polymerization method has a high helium permeation rate $[P_{He}]$ of from about $2 \times 10^{-3}$ to $6.8 \times 10^{-4}$ cm$^3$/cm$^2$.sec.cmHg. Nevertheless, these conventional composite gas separation membranes are disadvantageous for practical use in that they exhibit a low gas separation factor $[P_{He}]/[P_{N2}]$ of 13 to 32, and/or a low helium permeation rate of from $1.4 \times 10^{-5}$ to $2.0 \times 10^{-5}$ cm$^3$/cm$^2$.sec.cmHg.

SUMMARY OF THE INVENTION

An object of the present invention is to provide a method for enhancing the gas-separation performance of an aromatic polyimide membrane to produce an aromatic polyimide gas-separation membrane having a satisfactorily high helium gas-permeation rate and a very high gas separation factor with respect to a helium gas and a nitrogen gas, that can be used in industrial gas separation procedures.

Another object of the present invention is to provide a method for enhancing the gas-separation performance of an aromatic polyimide gas-separation membrane with high reproducibility.

The above-mentioned objects can be attained by applying the method of the present invention for enhancing the gas separation performance of an aromatic polyimide membrane, comprising the step of plasma-treating an asymmetric gas-separation membrane that comprises an aromatic polyimide comprising 80 to 100 molar % of at least one type of recurring units selected from the group consisting of those of the formulae (A) and (B):

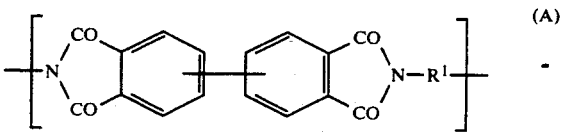

-continued

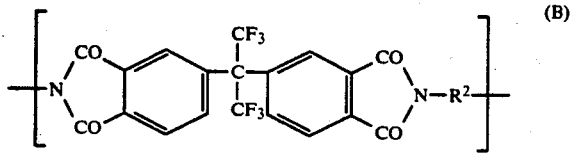
(B)

in which formulae (A) and (B), $R^1$ and $R^2$ respectively and independently from each other represent a divalent aromatic residue derived from an aromatic diamine compound, and 0 to 20 molar % of recurring units of the formula (C):

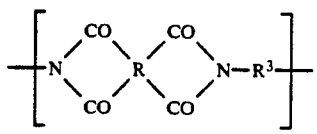
(C)

in formula (C) of which, R represents a tetravalent aromatic residue derived from an aromatic tetracarboxylic acid compound and different from the tetravalent armoatic residues appearing in the formulae (A) and (B), and $R^3$ represents a divalent aromatic residue derived from an aromatic diamine compound, and the membrane of which has helium gas permeation rate $[P_{He}]$ of $1 \times 10^{-4}$ cm$^3$/cm$^2$.sec.cmHg or more at a temperature of 80° C. and a ratio $[P_{He}]/[P_{N2}]$ of a permeation rate of helium gas $]P_{He}]$ therethrough to a permeation rate of nitrogen gas $[P_{N2}]$ therethrough of 20 or more at a temperature of 80° C., in an ammonia-containing gas atmosphere.

The tetravalent aromatic residues in the formulae (A) and (B) are of the formulae:

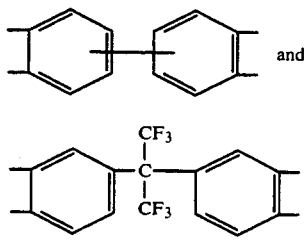

In the method of the present invention, the resultant enhanced gas separation aromatic polyimide membrane preferably exhibits a helium gas-permeation rate of $6 \times 10^{-5}$ cm$^3$/cm$^2$.sec.cmHg or more, and a ratio $[P_{He}]/[P_{N2}]$ in gas permeation rate of a helium gas $[P_{He}]$ to a nitrogen gas $[P_{N2}]$, of 50 or more, at a temperature of 80° C.

DESCRIPTION OF THE PREFERRED EMBODIMENTS

The method of the present invention can provide a gas-separation aromatic polyimide membrane imparted with an excellent gas-separation ability, by applying a specific chemical treatment with plasma generated by a glow discharge or a corona discharge in the presence of ammonia, to a specific gas separation asymmetric aromatic polyimide membrane, to form a cross-linked structure in a surface portion of the gas separation membrane and/or to introduce functional groups into the surface portion.

In the method of the present invention, an asymmetric gas separation membrane having a helium gas-permeation rate $[P_{He}]$ of $1 \times 10^{-4}$ cm$^3$/cm$^2$.sec.cmHg or more at a temperature of 80° C. and a gas permeation rate ratio $[P_{He}]/[P_{N2}]$ of a helium gas to a nitrogen gas of 20 or more at a temperature of 80° C., is prepared from a specific aromatic polyimide comprising the recurring units of the formulae (A) and/or (B), as major recurring units thereof.

The asymmetric gas separation aromatic polyimide membrane is subjected to a specific plasma treatment in which a high frequency plasma is applied to a surface of the aromatic polyimide membrane in an atmosphere comprising ammonia, preferably while an ammonia-containing gas is flowing at an ammonia supply flow rate of 0.01 at 100 cm$^3$(STP)/minutes.

The high frequency plasma can be generated by a glow discharge or a corona discharge.

The high frequency plasma is preferably a low temperature (cold) plasma at a frequency of 1 to 50 MHz and with a high frequency power of 1 to 100 W.

The plasma treatment is preferably carried out under a pressure of 0.01 to 10 torr, more preferably 0.05 to 5 torr at a temperature of the ammonia-containing atmosphere of 300° C. or less, more preferably 10° to 200° C. for a time period of 0.1 to 30 minutes, more preferably 0.3 to 10 minutes.

In the method of the present invention, the ammonia-containing gas atmosphere comprises 20 to 100 molar % of ammonia and 0 to 80 molar % of a diluting gas.

The diluting gas may comprise at least one member selected from organic compounds, for example, methane, ethane, propane, tetrafluoromethane (CF$_4$) and hexafluoroethane (C$_2$F$_6$), oxygen, hydrogen, nitrogen, air, helium, argon, carbon dioxide and carbon monoxide gases.

In the method of the present invention, preferably, the ammonia-containing gas atmosphere consists of ammonia and at least one inorganic gas selected from, for example, nitrogen, helium, argon, oxygen, hydrogene, and air, and is free from organic and inorganic substances that produce an undesirable polymeric layer on the membrane.

A polymeric material, from which the starting asymmetric gas separation membrane is produced, is an aromatic polyimide comprising 80 to 100 molar %, preferably 90 to 100 molar %, of at least one type of recurring units selected from the group consisting of those of the formulae (A) and (B) and 0 to 20 molar %, preferably 0 to 10 molar %, of recurring units of the formula (C).

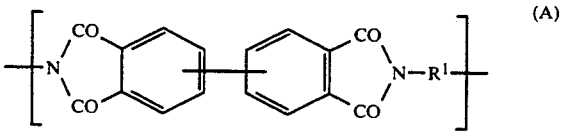
(A)

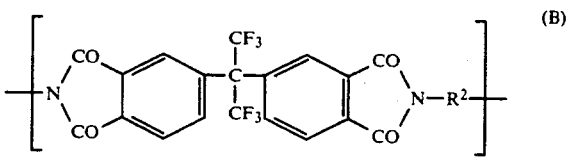
(B)

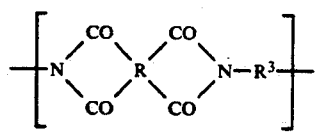

In the formulae (A), (B) and (C), $R^1$, $R^2$, $R^3$, and R are as defined above.

The recurring units of the formulae (A), (B) and (C) will be respectively referred to as recurring units (A), (B) and (C), hereinafter.

In a preferable embodiment of the present invention, the aromatic polyimide is a solvent-soluble aromatic polyimide (a) comprising 80 to 100 molar % of the recurring units (A) and 0 to 20 molar % of the recurring units (C).

In another preferable embodiment of the present invention, the aromatic polyimide is a solvent-soluble aromatic polyimide (b) comprising 5 to 70 molar %, more preferably 10 to 60 molar %, of the recurring units (A), 20 to 90 molar %, more preferably 30 to 80 molar % of the recurring units (B) and 0 to 20 molar %, more preferably 0 to 18 molar %, of the recurring units (C).

The aromatic polyimide (a) can be prepared by polymerize-imidizing an aromatic tetracarboxylic acid component comprising 80 to 100 molar % of a biphenyltetracarboxylic acid or dianhydride thereof and 0 to 20 molar % of an aromatic tetracarboxylic acid different from the biphenyltetracarboxylic acid, or dianhydride thereof, with an aromatic diamine component in a molar amount substantially equal to that of the aromatic tetracarboxylic acid component, in an organic polar solvent.

In the aromatic polyimide usable for the present invention, the recurring units (A) are preferably selected from specific recurring units of the formula (AA):

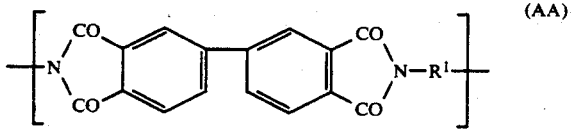

in which $R^1$ is as defined above.

Namely, the recurring units of the formula (AA), which will be referred to as recurring units (AA) hereinafter, are derived from 3,3',4,4'-biphenyltetracarboxylic acid or dianhydride polymerizeimidized, as an aromatic tetracarboxylic acid component, with an aromatic diamine component.

In the recurring units (C), R is a tetravalent aromatic residue derived from an aromatic tetracarboxylic acid or dianhydride, for example, pyromellitic acid, benzophenonetetracarboxylic acid, or biphenylethertetracarboxylic acid or a dianhydride of the above-mentioned acid, which are different from the biphenyltetracarboxylic acid or dianhydride. Preferable aromatic tetracarboxylic acid compounds for R are pyromellitic acid and dianhydride.

In the formulae (A), (B), (C) and (AA), $R^1$, $R^2$ and $R^3$ respectively and independently from each other represent a divalent aromatic residue derived from an aromatic diamine.

The aromatic diamine for $R^1$, $R^2$ and $R^3$ is preferably selected from, for example, the group consisting of (a-i) diaminodiphenylether compounds, for example, 4,4'-diaminodiphenylether, 3,4'-diaminodiphenylether and 3,3'-diaminodiphenylether;

(a-ii) diaminodiphenylmethane compounds, for example, 4,4'-diaminodiphenylmethane, 3,4'-diaminodiphenylmethane and 3,3'-diaminodiphenylmethane;

(a-iii) bis(aminophenyl)propane compounds, for example, 2,2-bis(3-aminophenyl)propane, 2,2-bis(4-aminophenyl)propane and 2,2-bis(4-aminophenyl) hexafluoropropane;

(a-iv) diaminodiphenylsulfone compounds, for example, 4,4'-diaminodiphenylsulfone and 3,4'-diaminodiphenylsulfone;

(a-v) diaminobenzophenone compounds, for example, 4,4'-diaminobenzophenone and 3,4'-diaminobenzophenone;

(a-vi) diaminodiphenylenesulfone compounds, for example, 3,7-diamino-2,8-dimethyl-diphenylenesulfone, 3,7-diamino-2,8-diethyl-diphenylenesulfone and 3,7-diamino-4,8-dimethyl-diphenylenesulfone;

(b-i) bis(aminophenoxy)benzene compounds, for example, 1,4-bis(3-aminophenoxy)benzene and 1,4-bis(4-aminophenoxy)benzene;

(b-ii) bis(aminophenyl)benzene compounds, for example, 1,4-bis(4-aminophenyl)benzene and 1,4-bis(3-aminophenyl)benzene;

(c-i) bis[(aminophenoxy)phenyl]propane compounds, for example, 2,2-bis[4-(4-aminophenoxy)phenyl]propane, 2,2-bis[4-(4-aminophenoxy) phenyl]propane, and 2,2-bis[4-(4-aminophenoxy) phenyl]hexafluoropropane;

(c-ii) bis[(aminophenoxy)phenyl]sulfone compounds, for example, 2,2-bis[4-(4-aminophenoxy)phenyl]sulfone, and 2,2-bis[4-(3-aminophenoxy)phenyl]sulfone; and (d) phenylene diamine compounds, for example, o-, m-, and p-phenylene diamines and 3,5-diaminobenzoic acid.

Preferably, the aromatic diamine component usable for the present invention comprises, as a major ingredient, for example, about 80 molar % or more, more preferably 90 to 100 molar % of, an aromatic diamine compound having a plurality of benzene rings, preferably 2 to 4 benzene rings that may be separated from each other or condensed together.

More preferably, the aromatic diamine component comprises, as a major ingredient, at least one member selected from diamino diphenylene sulfone compounds, diamino diphenylether compounds, diamino diphenylmethane compounds and bis(aminophenoxy)benzene compounds.

Preferably, the aromatic polyimide usable for the present invention has a logarithmic viscosity number of 0.1 to 7, more preferably 0.2 to 5, determined at a concentration of 0.5 g/100 ml in a solvent consisting of 4 parts by volume of p-chlorophenol and 1 part by volume of o-chlorophenol at a temperature of 30° C.

The starting asymmetric gas separation membrane usable for the present invention is in the form of a flat membrane or a hollow fiber and preferably has a thickness of 10 to 500 μm, more preferably 20 to 300 μm.

When it is in the form of a hollow fiber, the starting asymmetric gas separation membrane can be produced by the following dry-jet wet process as disclosed in British Patent Publication No. 2,102,333A or U.S. Pat. No. 4,460,526.

An aromatic polyimide resin as defined above is uniformly dissolved in an organic polar solvent to provide a dope solution having preferably a rotation viscosity of 10 to 20,000 poises, more preferably 50 to 10,000 poises. The dope solution is extruded through a hollow filament-spinning nozzle at a spinning nozzle extrusion temperature of preferably about 60° C. to 150° C., more preferably 70° C. to 120° C. The resultant hollow filamentary stream of the dope solution is partially dried and then coagulated in a coagulating liquid at a temperature of −10° C. to 60° C., to provide a hollow filamentary gas separation membrane. This hollow filament-producing process can be carried out at a spinning speed of 2 to 80 m/minutes.

Preferably, the hollow filamentary membrane produced by the above-mentioned process is treated in an aliphatic hydrocarbon solvent comprising at least one member selected from, for example, isopentane, n-hexane, isooctane and n-heptane, to replace the organic polar solvent remaining in the hollow filamentary membrane by the aliphatic hydrocarbon solvent, and then dried at a temperature of about 50° C. to 150° C. to evaporate the aliphatic hydrocarbon solvent, and to provide a dried hollow filamentary membrane.

Optionally, the dried hollow filamentary membrane is heat-treated at a temperature of 150° C. to 300° C. for a short time of 10 to 7200 seconds.

Also, the dope solution can be converted to a flat membrane using a customary flat membrane-forming method.

The organic polar solvent usable for the preparation of the dope solution may be the same as the polymerization solvent for the aromatic polyimide.

The organic polar solvent preferably has a melting point of 200° C. or less, more preferably 150° C. or less and comprises, as a major component thereof, at least one member selected from:

(1) phenolic compounds including:

(i) phenol compounds, for example, phenol, cresol, and xylenol;

(ii) catechol compounds in which two hydroxyl groups are directly attached to a benzene ring structure; and (iii) halogenated phenol compounds, for example, 3-chlorophenol, 4-chlorophenol (PCP), 4-bromophenol and 2-chloro-5-hydroxy-toluene; and (2) amide compounds, for example, N-methyl-2-pyrolidone, N,N-dimethylacetamide, N,N-diethylacetamide, N,N-dimethyl-formamide and N,N-diethylformamide.

The above-mentioned organic polar solvents can uniformly dissolve the aromatic polyimide therein at a temperature of 10° to 200° C.

The reasons why the plasma-treatment in the presence of ammonia effectively cause the resultant aromatic polyimide membrane to exhibit an enhanced gas-permeation rate and gas separation factor, have not yet been made clear. However, it is assumed that the above-mentioned plasma treatment causes cross-linkages to be formed in the surface portion of the polyimide gas separation membrane and/or functional groups to be introduced into the surface portion.

As a result of the plasma treatment in accordance with the present invention, the resultant aromatic polyimide gas separation membrane exhibits a gas separation factor $[P_{He}]/[P_{N_2}]$ of 50 or more and a gas separation factor $[P_{He}]/[P_{CH_4}]$ of 70 or more, each at a temperature of 80° C.

EXAMPLES

The present invention will be further explained by the following examples.

In the examples, the gas-permeation properties of the hollow filamentary gas separation membrane were measured in the following manner.

A hollow filament bundle element for the measurement of the gas-permeation properties was prepared from hollow filaments, a stainless steel pipe and an epoxy resin binder.

The hollow filament bundle element was attached to a stainless steel container for a gas-permeation tester.

A mixed gas containing a helium gas and a nitrogen gas was supplied to the gas-permeation tester at a temperature of 80° C. under a differential pressure of 10 kg/cm$^2$.

The permeation rates of the helium and nitrogen gases $[P_{He}]$ and $[P_{N_2}]$ and a gas separation factor $[P_{He}]/[P_{N_2}]$ were determined from gas-chromatographic analysis of the permeated gas fraction and non-permeated gas fraction.

In the same manner as mentioned above, a permeation rate of a methane gas $[P_{CH_4}]$ and a gas separation factor $[P_{He}]/[P_{CH_4}]$ were determined.

PREPARATION EXAMPLE 1

Preparation of aromatic polyimide solution (a)

A mixture of an aromatic tetracarboxylic acid component consisting of 99 m moles of 3,3',4,4'-biphenyltetracarboxylic dianhydride with an aromatic diamine component consisting of 60 m moles of 4,4'-diaminodiphenylether, 30 m moles of 3,5-diaminobenzoic acid and 10 m moles of 4,4'-diaminodiphenylmethane, was placed together with 217 g of p-chlorophenol in a separable flask equipped with a stirrer and an inlet for introducing therein a nitrogen gas.

The reaction mixture was subjected to a polymerization-imidization reaction procedure at a temperature of 180° C. for 16 hours while stirring to provide an aromatic polyimide solution (a) having a polymer concentration of 17% by weight.

The solution (a) had a rotation viscosity of 2,000 poises at a temperature of 100° C. and a rotation viscosity of 2800 poises at a temperature of 90° C.

The aromatic polyimide in the solution (a) had a logarithmic viscosity of 1.6 determined at a concentration of 0.5 g/100 ml in a solvent consisting of 4 parts by volume of p-chlorophenol and 1 part by volume of o-chlorophenol at a temperature of 30° C.

PREPARATION EXAMPLE 2

Preparation of aromatic polyimide solution (b)

A mixture of an aromatic tetracarboxylic acid component consisting of 55 m moles of 2,2'-bis(dicarboxypheyl)hexafluoropropane dianhydride, 30 m moles of 3,3',4,4'-biphenyltetracarboxylic dianhydride and 14 m mole of pyromellitic dianhydride with an aromatic diamine component consisting of 90 m moles of 3,7-diamino-2,8-dimethyl-diphenylenesulfone and 10 m moles of 4,4'-diaminodiphenylmethane, was placed together with 312 g of p-chlorophenol in a separable flask equipped with a stirrer and an inlet for introducing therein a nitrogen gas.

The reaction mixture was subjected to a polymerization-imidization reaction procedure at a temperature of 180° C. for 16 hours while stirring to provide an aromatic polyimide solution (b) having a polymer concentration of 16% by weight.

The solution (b) had a rotation viscosity of 1,079 poises at a temperature of 100° C. and a rotation viscosity of 1507 poises at a temperature of 90° C.

The aromatic polyimide in the solution (b) had a logarithmic viscosity of 1.1 determined at a concentration of 0.5 g/100 ml in a solvent consisting of 4 parts by volume of p-chlorophenol and 1 part by volume of o-chlorophenol at a temperature of 30° C.

PREPARATION EXAMPLE 3

Preparation of aromatic polyimide solution (c)

A mixture of an aromatic tetracarboxylic acid component consisting of 99 m moles of 3,3',4,4'-biphenyltetracarboxylic dianhydride with an aromatic diamine component consisting of 90 m moles of 3,7-diamino-2,8-dimethyl-diphenylenesulfone and 10 m moles of 4,4'-diaminodiphenylether, was placed together with 298 g of p-chlorophenol in a separable flask equipped with a stirrer and an inlet for introducing therein a nitrogen gas.

The reaction mixture was subjected to a polymerization-imidization reaction procedure at a temperature of 180° C. for 16 hours while stirring to provide an aromatic polyimide solution (c) having a polymer concentration of 15% by weight.

The solution (c) had a rotation viscosity of 1,200 poises at a temperature of 100° C. and a rotation viscosity of 1,750 poises at a temperature of 90° C.

The aromatic polyimide in the solution (c) had a logarithmic viscosity of 1.3 determined at a concentration of 0.5 g/100 ml in a solvent consisting of 4 parts by volume of p-chlorophenol and 1 part by volume of o-chlorophenol at a temperature of 30° C.

PREPARATION EXAMPLE (4)

Preparation of starting hollow-filamentary gas separation membrane (a)

The aromatic polyimide solution (a) prepared in Preparation Example 1 was filtered through a 400 mesh stainless steel screen to provide a spinning dope solution.

The dope solution was fed into a spinning apparatus provided with a hollow filament-spinning nozzle having a circle opening with an outside diameter of 1,000 $\mu$m, a circle opening with a slit width and a core opening with an outside diameter, as disclosed in U.S. Pat. No. 4,460,526, and extruded through the nozzle to form a hollow filamentary stream of the dope solution. The hollow filamentary stream of the dope solution was passed through a dry nitrogen gas atmosphere for a short period and then introduced into a primary coagulating bath containing therein an aqueous solution of 65% by weight of ethyl alcohol at a temperature of about 0° C., and then into a secondary coagulating bath containing the same coagulating liquid as mentioned above and equipped with a pair of guide rolls at a temperature of about 0° C., and reciprocally passed between the guide rolls to complete the coagulation of the dope solution stream. The resultant asymmetric aromatic polyimide hollow filament was taken up from the coagulating bath through a taking-up roll at a speed of 15 m/minute.

The aromatic polyimide hollow filament was wound around a bobbin and fully washed with ethyl alcohol to remove the coagulation medium, the ethyl alcohol remaining in the hollow filament was replaced by a isooctane, and the resultant asymmetric aromatic polyimide hollow filament was dried at a temperature of 100° C. so as to evaporate the isooctane from the hollow filament.

Then, the dried hollow filament was heat treated at a temperature of 270° C. for 30 minutes to provide a starting asymmetric hollow filamentary gas separation membrane (a).

The starting hollow filamentary gas separation membrane (a) had an outside diameter of 360 $\mu$m and a thickness of 82 $\mu$m.

The starting gas separation membrane (a) was then subjected to the gas permeation test.

The test results are shown in Tables 1, 2 and 3.

PREPARATION EXAMPLE 5

Preparation of starting hollow filamentary gas separation membrane (b)

A starting asymmetric hollow filamentary gas separation membrane (b) was prepared from the aromatic polyimide solution (b) prepared in Preparation Example 2, using the same procedures as in Preparation Example 4, except that the resultant starting hollow filamentary gas separation membrane had an outside diameter of 420 $\mu$m and a thickness of 70 $\mu$m.

The test results are shown in Tables 1, 2 and 3.

PREPARATION EXAMPLE 6

Preparation of starting hollow filamentary gas separation membrane (c)

A starting asymmetric hollow filamentary gas separation membrane (c) was prepared from the aromatic polyimide solution (c) prepared in Preparation Example 3, using the same procedures as in Preparation Example 4, except that the heat treatment after the evaporation of isooctane was carried out at a temperature of 300° C. and the resultant starting hollow filamentary gas separation membrane had an outside diameter of 440 $\mu$m and a thickness of 104 $\mu$m.

The test results are shown in Tables 1, 2 and 3.

EXAMPLE 1

The starting asymmetric hollow filamentary aromatic polyimide gas separation membrane (a) prepared in Preparation Example 4 was wound around a frame. The resultant frame was placed in a bell jar and subjected to a plasma treatment in the presence of ammonia with a high frequency power of 20 W under a pressure of 0.8 torr, while passing an ammonia gas through the jar at a flow rate of 50 cm:(STP)/minute at a temperature of 25° C. for 3 minutes.

The resultant plasma treated gas separation membrane was subjected to the gas permeation test.

The test results (gas permeation rate and gas separation factor) are shown in Table 1.

EXAMPLES 2 TO 4

In each of Examples 2 to 4, a starting asymmetric hollow filamentary aromatic polyimide gas separation membrane (a) was subjected to the same plasma treatment as in Example 1, except that the flow rate of the ammonia gas, the pressure in the bell jar, the high frequency power and plasma treatment time were adjusted as shown in Table 1.

The test results are shown in Table 1.

COMPARATIVE EXAMPLES 1 TO 4

In each of Comparative Examples 1 to 4, a starting hollow filamentary aromatic polyimide gas separation membrane (a) prepared in Preparation Example 4 was wound around a hank frame, and the resultant hank was subjected to an additional heat treatment at a temperature as shown in Table 1 for 30 minutes to provide a comparative gas separation membrane.

The resultant comparative gas separation membrane was subjected to the gas-permeation test as mentioned above. The test results are shown in Table 1.

in the presence of ammonia in the same manner as in Example 1, except that the plasma treatment time was as indicated in Table 2.

The resultant gas separation membrane was subjected to the gas-permeation test as described above.

The test results are shown in Table 2.

COMPARATIVE EXAMPLES 4 TO 9

In each of Comparative Examples 4 to 9, a starting hollow filamentary aromatic polyimide gas-separation membrane (b) prepared in Preparation Example 5 was subjected to an additional heat treatment at a temperature as shown in Table 2 for 30 minutes, to provide a comparative gas separation membrane.

The results of the gas-permeation test are shown in Table 2.

TABLE 1

| Example No. | Type of starting gas separation membrane | Plasma treatment Flow rate of ammonia (cm³/min) | Pressure in bell jar (Torr) | High frequency power (W) | Treatment time (min) | Additional heat treatment Temperature (°C.) | Time (min) | Helium gas permeation rate (cm³/cm²·sec·cmHg) $[P_{He}]$ | Nytrogen gas permeation rate (cm³/cm²·sec·cmHg) $[P_{N2}]$ | He/N₂ gas separation factor $[P_{He}]/[P_{N2}]$ |
|---|---|---|---|---|---|---|---|---|---|---|
| Preparation Example 4 | (a) | — | — | — | — | — | — | $1.7 \times 10^{-4}$ | $9.3 \times 10^{-7}$ | 183 |
| Example 1 | (a) | 50 | 0.8 | 20 | 3 | — | — | $1.2 \times 10^{-4}$ | $3.5 \times 10^{-7}$ | 347 |
| 2 | (a) | 50 | 0.8 | 20 | 5 | — | — | $1.4 \times 10^{-4}$ | $4.6 \times 10^{-7}$ | 306 |
| 3 | (a) | 50 | 0.8 | 50 | 3 | — | — | $1.5 \times 10^{-4}$ | $6.1 \times 10^{-7}$ | 290 |
| 4 | (a) | 50 | 0.8 | 50 | 3 | — | — | $1.4 \times 10^{-4}$ | $5.7 \times 10^{-7}$ | 246 |
| Comparative Example 1 | (a) | — | — | — | — | 270 | 30 | $1.3 \times 10^{-4}$ | $8.7 \times 10^{-7}$ | 149 |
| 2 | (a) | — | — | — | — | 280 | 30 | $1.1 \times 10^{-4}$ | $7.3 \times 10^{-7}$ | 151 |
| 3 | (a) | — | — | — | — | 290 | 30 | $9.2 \times 10^{-5}$ | $5.8 \times 10^{-7}$ | 160 |
| 4 | (a) | — | — | — | — | 300 | 30 | $6.5 \times 10^{-5}$ | $4.0 \times 10^{-7}$ | 161 |

Note: The starting gas separation membrane (a) was prepared in Preparation Example 4.

EXAMPLES 5 AND 6

In each of Examples 5 and 6, a starting hollow filamentary aromatic polyimide gas-separation membrane (b) made in Preparation Example 5 was plasma-treated

TABLE 2

| Example No. | Type of starting gas separation membrane | Plasma treatment Flow rate of ammonia (cm³/min) | Pressure in bell jar (Torr) | High frequency power (W) | Treatment time (min) | Additional heat treatment Temperature (°C.) | Time (min) |
|---|---|---|---|---|---|---|---|
| Preparation Example 5 | (b) | — | — | — | — | — | — |
| Example 5 | (b) | 50 | 0.8 | 50 | 3 | — | — |
| 6 | (b) | 50 | 0.8 | 50 | 10 | — | — |
| Comparative Example 5 | (b) | — | — | — | — | 270 | 30 |
| 6 | (b) | — | — | — | — | 300 | 30 |
| 7 | (b) | — | — | — | — | 355 | 30 |
| 8 | (b) | — | — | — | — | 370 | 30 |
| 9 | (b) | — | — | — | — | 390 | 30 |

| Example No. | Helium gas permeation rate (cm³/cm²·sec·cmHg) $[P_{He}]$ | Nitrogen gas permeation rate (cm³/cm²·sec·cmHg) $[P_{N2}]$ | He/N₂ gas separation factor $[P_{He}]/[P_{N2}]$ | Methane gas permeation rate (cm³/cm²·sec·cmHg) $[P_{CH4}]$ | He/CH₄ gas separation factor $[P_{He}]/[P_{CH4}]$ |
|---|---|---|---|---|---|
| Preparation Example 5 | $10.1 \times 10^{-4}$ | $28.9 \times 10^{-6}$ | 35 | $22.3 \times 10^{-6}$ | 45 |
| Example 5 | $6.1 \times 10^{-4}$ | $6.1 \times 10^{-6}$ | 100 | $5.3 \times 10^{-6}$ | 116 |
| 6 | $6.3 \times 10^{-4}$ | $5.3 \times 10^{-6}$ | 119 | $4.2 \times 10^{-6}$ | 148 |
| Comparative Example 5 | $10.1 \times 10^{-4}$ | $29.1 \times 10^{-6}$ | 35 | — | — |
| 6 | $7.7 \times 10^{-4}$ | $20.9 \times 10^{-6}$ | 37 | — | — |
| Example 7 | $5.5 \times 10^{-4}$ | $13.5 \times 10^{-6}$ | 41 | — | — |
| 8 | $4.9 \times 10^{-4}$ | $13.0 \times 10^{-6}$ | 42 | $9.0 \times 10^{-6}$ | 65 |

TABLE 2-continued

| | | | | | |
|---|---|---|---|---|---|
| 9 | $6.5 \times 10^{-5}$ | $11.7 \times 10^{-6}$ | 42 | $6.8 \times 10^{-6}$ | 72 |

Note: The starting gas separation membrane (b) was prepared in Preparation Example 5.

EXAMPLES 7 TO 10

In each of Examples 7 to 10, a starting hollow filamentary aromatic polyimide gas-separation membrane (c) made in Preparation Example 6 was plasma-treated in the presence of ammonia in the same manner as in Example 1, except that the high frequency power and the treatment time were as indicated in Table 3.

The resultant gas separation membrane was subjected to the gas permeation test as mentioned above.

The results are shown in Table 3.

COMPARATIVE EXAMPLES 10 TO 13

In each of Comparative Examples 10 to 13, a starting hollow filamentary aromatic polyimide gas-separation membrane (c) prepared in Preparation Example 6 was subjected to an additional heat treatment at a temperature as shown in Table 3 for 30 minutes, to provide a comparative gas-separation membrane.

The results of the gas-permeation test are shown in Table 3.

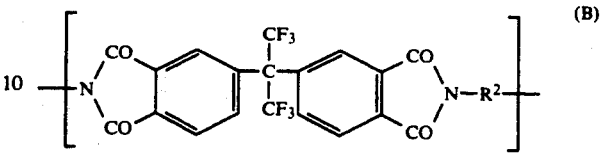

in which formulae (A) and (B), $R^1$ and $R^2$ respectively and independently from each other represent a divalent aromatic residue derived from an aromatic diamine compound, and 0 to 20 molar % of recurring units of the formula (C):

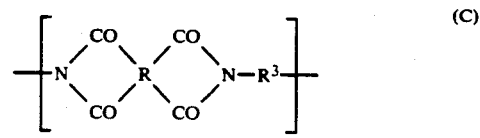

TABLE 3

| | | Plasma treatment | | | | Additional heat treatment | | Gas-permeation performance of gas separation membrane | | |
|---|---|---|---|---|---|---|---|---|---|---|
| Example No. | Type of starting gas separation membrane | Flow rate of ammonia (cm³/min) | Pressure in bell jar (Torr) | High frequency power (W) | Treatment time (min) | Temperature (°C.) | Time (min) | Helium gas permeation rate $[P_{He}]$ | Nytrogen gas permeation rate (cm³/cm² · sec · cmHg) $[P_{N2}]$ | He/N₂ gas separation factor $[P_{He}]/[P_{N2}]$ |
| Preparation Example 6 | (c) | — | — | — | — | — | — | $2.3 \times 10^{-4}$ | $2.5 \times 10^{-6}$ | 93 |
| Example 7 | (c) | 50 | 0.8 | 5 | 3 | — | — | $1.9 \times 10^{-4}$ | $1.3 \times 10^{-6}$ | 151 |
| 8 | (c) | 50 | 0.8 | 20 | 3 | — | — | $1.9 \times 10^{-4}$ | $4.0 \times 10^{-6}$ | 184 |
| 9 | (c) | 50 | 0.8 | 20 | 5 | — | — | $2.0 \times 10^{-4}$ | $1.3 \times 10^{-6}$ | 154 |
| 10 | (c) | 50 | 0.8 | 50 | 3 | — | — | $2.0 \times 10^{-4}$ | $1.3 \times 10^{-6}$ | 153 |
| Comparative 10 | (c) | — | — | — | — | 300 | 30 | $1.7 \times 10^{-4}$ | $1.9 \times 10^{-6}$ | 88 |
| ative 11 | (c) | — | — | — | — | 310 | 30 | $1.9 \times 10^{-4}$ | $2.5 \times 10^{-6}$ | 76 |
| Example 12 | (c) | — | — | — | — | 320 | 30 | $2.0 \times 10^{-5}$ | $2.5 \times 10^{-6}$ | 79 |
| 13 | (c) | — | — | — | — | 330 | 30 | $1.5 \times 10^{-5}$ | $1.7 \times 10^{-6}$ | 87 |

Note: The starting gas-separation membrane (c) was prepared in Preparation Example 6.

We claim:

1. A method of enhancing the gas separation performance of an aromatic polyimide membrane, comprising:

plasma-treating an asymmetric gas-separation aromatic polyimide membrane that comprises 80 to 100 molar % of at least one type of recurring units selected from the group consisting of those of the formulae (A) and (B):

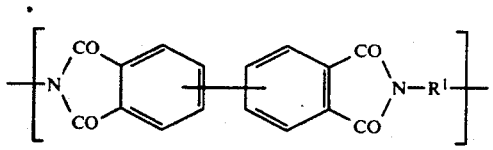

in which formula (C), R represents a tetravalent aromatic residue derived from an aromatic tetracarboxylic acid compound and different from the tetravalent aromatic residues appearing in the formulae (A) and (B), and $R^3$ represents a divalent aromatic residue derived from an aromatic diamine compound, and the membrane of which allows a helium gas to permeate therethrough at a permeation rate $[P_{He}]$ of $1 \times 10^{-4}$ cm³/cm².sec.cmHg or more at a temperature of 80° C. and has a ratio $[P_{He}]/[P_{N2}]$ of a permeation rate of helium gas $[P_{He}]$ therethrough to a permeation rate of nitrogen gas $[P_{N2}]$ therethrough of 20 or more at a temperature of 80° C., in an ammonia-containing gas atmosphere.

2. The method as claimed in claim 1, wherein the plasma is generated by a glow discharge or corona discharge.

3. The method as claimed in claim 1, wherein the plasma is a cold plasma at a frequency of 1 to 50 MHz with a high frequency power of 1 to 100 W.

4. The method as claimed in claim 1, wherein the plasma treatment is carried out under a pressure of 0.01 to 10 torr with the ammonia-containing atmosphere being 300° C. or less for a time period of 0.1 to 30 minutes.

5. The method as claimed in claim 1, wherein the ammonia-containing gas atmosphere comprises 20 to 100 molar % of ammonia and 0 to 80 molar % of a diluting gas.

6. The method as claimed in claim 5, wherein the diluting gas comprises at least one member selected from the group consisting of methane, ethane, propane, tetrafluoromethane, hexafluoroethane, oxygen, hydrogen, nitrogen, air, helium argon, carbon dioxide and carbon monoxide.

7. The method as claimed in claim 5, wherein the ammonia-containing gas atmosphere consists of ammonia and at least one inorganic gas selected from the group consisting of nitrogen, helium, argon, oxygen, hydrogen and air gases.

8. The method as claimed in claim 1, wherein ammonia flows through the plasma treatment atmosphere at a flow rate of from 0.01 to 100 cm³/min.

9. The method as claimed in claim 1, wherein the asymmetric gas-separation membrane comprises at least one member selected from the group consisting of:
(a) solvent soluble aromatic polyimide comprising 80 to 100 molar % of the recurring units of the formula (A) and 0 to 20 molar % of the recurring units of the formula (C), and
(b) solvent soluble aromatic polyimide comprising 5 to 70 molar % of the recurring units of the formula (A), 20 to 90 molar % of the recurring units of the formula (B) and 0 to 20 molar % of the recurring units of the formula (C).

10. The method as claimed in claim 1, wherein the recurring units of the formula (A) are of the formula (AA):

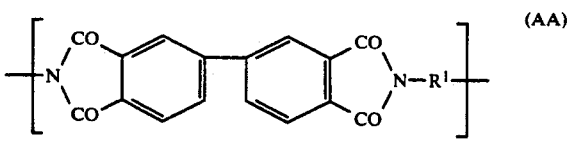

wherein $R^1$ is as defined above.

11. The method as claimed in claim 1, wherein the asymmetric gas-separation membrane is in the form of a hollow filament.

12. The method as claimed in claim 1, wherein the asymmetric gas-separation membrane is in the form of a flat membrane.

13. The method as claimed in claim 1, wherein the asymmetric gas-separation membrane has a thickness of 10 to 500 μm.

14. The method as claimed in claim 1, wherein the asymmetric gas-separation membrane has a logarithmic viscosity number of 0.1 to 7, determined at a concentration of 0.5 g/100 ml in a solvent consisting of 4 parts by volume of p-chlorophenol and 1 part by volume of o-chlorophenol at a temperature of 30° C.

15. The method as claimed in claim 1, wherein the resultant enhanced gas separation membrane exhibits a helium gas permeation rate $[P_{He}]$ of $6 \times 10^{-5}$ cm³/cm².sec.cmHg or more, at a temperature of 80° C.

16. The method as claimed in claim 1, wherein the resultant enhanced gas separation membrane exhibits a ratio $[P_{He}]/[P_{N2}]$ in permeation rate of helium gas to nitrogen gas of 50 or more at a temperature of 80° C.

17. The method as claimed in claim 1, wherein the resultant enhanced gas separation membrane exhibits a ratio $[P_{He}]/[P_{CH4}]$ of the helium gas permeation rate $[P_{He}]$ to a methane gas permeation rate $[P_{CH4}]$ of 70 or more, at a temperature of 80° C.

* * * * *